United States Patent
Koyama

(10) Patent No.: US 7,558,181 B2
(45) Date of Patent: Jul. 7, 2009

(54) OPTICAL INFORMATION RECORDING/REPRODUCTION APPARATUS

(75) Inventor: Osamu Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 11/417,170

(22) Filed: May 4, 2006

(65) Prior Publication Data

US 2006/0262705 A1  Nov. 23, 2006

(30) Foreign Application Priority Data

May 23, 2005  (JP)  ............................. 2005-149453

(51) Int. Cl.
*G11B 7/00* (2006.01)

(52) U.S. Cl. .................. 369/112.24; 359/642

(58) Field of Classification Search ........................ None
See application file for complete search history.

(56) References Cited

U.S. PATENT DOCUMENTS

| | | | |
|---|---|---|---|
| 4,803,579 A | 2/1989 | Koyama | 360/114 |
| 4,813,032 A | 3/1989 | Koyama | 369/13 |
| 4,953,124 A | 8/1990 | Koyama | 365/122 |
| 5,004,307 A * | 4/1991 | Kino et al. | 359/356 |
| 5,029,261 A | 7/1991 | Koyama et al. | 250/201.5 |
| 5,039,202 A | 8/1991 | Koyama et al. | 359/823 |
| 5,231,621 A | 7/1993 | Matsui et al. | 369/44.32 |
| 5,293,371 A | 3/1994 | Koyama | 369/110 |
| 5,293,569 A | 3/1994 | Koyama | 369/112 |
| 5,347,503 A | 9/1994 | Koyama et al. | 369/44.32 |
| 5,404,346 A | 4/1995 | Koyama et al. | 369/44.32 |
| 5,517,475 A | 5/1996 | Koyama et al. | 369/44.32 |
| 5,517,480 A | 5/1996 | Matsuoka et al. | 369/110 |
| 5,532,990 A | 7/1996 | Koyama et al. | 369/44.32 |
| 5,546,373 A | 8/1996 | Koyama | 369/120 |
| 5,608,716 A | 3/1997 | Koyama et al. | 369/275.1 |
| 5,745,449 A | 4/1998 | Koyama | 369/44.32 |
| 6,141,302 A | 10/2000 | Koyama et al. | 369/44.24 |
| 6,282,165 B1 | 8/2001 | Koyama et al. | 369/118 |
| 6,418,109 B2 | 7/2002 | Koyama et al. | 369/118 |
| 6,724,694 B2 * | 4/2004 | Knight et al. | 369/13.55 |
| 2005/0122860 A1 | 6/2005 | Koyama | 369/44.32 |
| 2005/0180283 A1 * | 8/2005 | Ishimoto et al. | 369/53.19 |
| 2005/0232120 A1 * | 10/2005 | Shinoda | 369/112.23 |
| 2006/0280897 A1 | 12/2006 | Koyama | 428/64.4 |
| 2007/0121468 A1 | 5/2007 | Koyama et al. | 369/103 |
| 2007/0217300 A1 | 9/2007 | Koyama et al. | 369/44.23 |

* cited by examiner

*Primary Examiner*—Joseph Feild
*Assistant Examiner*—Joseph Haley
(74) *Attorney, Agent, or Firm*—Fitzpatrick, Cella, Harper and Scinto

(57) ABSTRACT

Provided is an optical information recording/reproduction apparatus in which a tilt margin in a radial direction of an optical disk is increased to thereby reduce a danger that the optical disk and a solid immersion lens come into contact with each other as compared with a conventional case. The optical information recording/reproduction apparatus of the present invention includes: an objective lens for condensing a light beam from a light source; and a solid immersion lens (SIL) that is disposed between the objective lens and an optical recording medium, in which a shape of a bottom surface of the SIL on a recording medium side of the SIL is formed such that a length of the bottom surface in a radial direction orthogonal to a track direction of the recording medium is shorter than a length of the bottom surface in the track direction.

5 Claims, 8 Drawing Sheets

OPTICAL INFORMATION RECORDING/REPRODUCTION APPARATUS

BACKGROUND OF THE INVENTION

1. Field of the Invention

The present invention relates to an optical information recording/reproduction apparatus such as an optical disk apparatus. In particular, the present invention relates to a solid immersion lens (hereinafter, abbreviated as "SIL") for near-field recording having a bottom surface in a shape with which the SIL hardly collides with a surface of an optical disk when the disk is warped or inclined (tilted).

2. Related Background Art

In order to attain a higher recording density of an optical disk, it is required to reduce a diameter of a light spot on a recording surface of the optical disk by shortening a wavelength of light used for recording/reproduction and by increasing a numerical aperture (NA) of an objective lens.

Conventionally, attempts have been made in which the front lens of an objective lens is placed in proximity to a recording surface of an optical disk such that a distance between the front lens and the recording surface is reduced to a fraction (½, for instance) or less of a recording wavelength to construct a so-called SIL, thereby obtaining an NA of one or more even in the air.

For instance, a detailed description thereof is given in "High-density Near-field Readout over 50 GB Capacity Using Solid Immersion Lens with High Refractive Index".

A conventional technique will be described with reference to FIG. 6, FIGS. 7A and 7B, and FIGS. 8A and 8B.

A construction of an optical pickup for near-field recording according to a conventional example will be described with reference to FIG. 6.

A light beam emitted from a semiconductor laser 3 is converted into a parallel light beam by a collimator lens 4 and enters a beam expander 5.

The beam expander 5 is a lens for correcting a spherical aberration occurred at a rear lens or an SIL 13 of an objective lens to be described later and is constructed such that a distance between two lenses of the beam expander is controllable in accordance with the spherical aberration.

A grating 6 is a member for generating a sub-beam for tracking.

The light beam that has passed through a beam splitter (BS) 7 and a polarizing beam splitter (PBS) 8 passes through a ¼ wavelength plate 9 to be converted from linearly polarized light into circularly polarized light.

A photodetector for receiving a part of the light beam reflected by the beam splitter 7 and controlling an emission power of the semiconductor laser 3 may also be provided.

The light beam, whose course is bent by 90° by an upwardly reflecting mirror 10, enters a rear lens 11 of the objective lens.

The objective lens is composed of the rear lens 11 and the SIL (front lens) 13 and mounted on a two-axis actuator 12 that integrally drives the rear lens 11 and the SIL (front lens) 13 in a focus direction and a tracking direction.

There are two types for the SIL 13, one of which is shown in FIG. 7A and the other of which is shown in FIG. 7B.

In FIG. 7A, a light beam condensed by the rear lens 11 of the objective lens is focused on a bottom surface of an SIL 13-$a$ that is a hemispherical lens.

The light beam is vertically incident on a spherical surface of the hemispherical lens and takes the same optical path to be focused on the bottom surface as in the case where the hemispherical lens is not provided. Accordingly, a wavelength shortened by a reflective index of the hemispherical lens is obtained, which produces an effect of reducing a diameter of a light spot.

That is, when the refractive index of the hemispherical lens is referred to as "N" and the numerical aperture of the rear lens 11 is referred to as "NA", a light spot having a size of "N×NA" is obtained on a recording surface of an optical disk 14.

For instance, when the rear lens 11 having an NA of 0.75 is used in combination with an SIL that is a hemispherical lens having N of 2, an effective NA (hereinafter referred to as "NAeff") reaches 1.5.

An allowable thickness error of the hemispherical lens 13-$a$ is around 10 μm, which facilitates mass production. Also, a wide viewing angle can be secured, so it is also easy to provide a sub-beam for tracking.

On the other hand, in FIG. 7B, a light beam condensed by the rear lens 11 is focused on a bottom surface of an SIL 13-$b$ that is a super-hemispherical lens.

The bottom surface of the SIL 13-$b$ is a surface that is spaced apart from a center of the super-hemispherical SIL 13-$b$ by R/N.

When an angle formed by an optical axis and the light beam at the bottom surface is referred to as "θt", a relation expressed by Expression (1) given below holds true between the angle θt and an angle θi formed by the light beam incident on the SIL and the optical axis.

$$\sin \theta t = N \times \sin \theta i \qquad \text{Expression (1)}$$

Here, sin θi is the NA of the rear lens 11, so in view of a fact that the light beam is condensed in the SIL having a refractive index of N, a light spot having a size of $N^2 \times NA$ is obtained on the recording surface of the optical disk 14.

A condition that the light beam can be incident on the SIL 13-$b$ limits the NA of the rear lens 11 to 1/N or less according to Expression (1).

When the SIL 13-$b$ is made of a glass material having N of 2, it is possible to obtain a light spot corresponding to an NAeff of 1.8 even when a rear lens having NA of relatively low, for instance, 0.45 can be used as the rear lens 11.

In this case, however, there is a problem in that an allowable thickness error of the hemispherical lens 13-$b$ is limited to around 1 μm.

In either case of these SILs, a distance between the SIL bottom surface and the optical disk 14 is a fraction or less of 405 nm which is the wavelength of a light source. This is because only the case where the distance between the SIL bottom surface and the optical disk is as small as 100 nm or less allows the light beam to act on the recording surface as evanescent light from the SIL bottom surface to attain recording/reproduction with an NAeff light spot diameter.

In order to maintain this distance, gap servo to be described later is used.

The light beam is reflected by the optical disk 14 to become reversed circularly polarized light, and enters the SIL 13 and the rear lens 11 to be converted into a parallel light beam again.

The light beam then passes through the ¼ wavelength plate 9 to be converted into linearly polarized light in a direction orthogonal to the direction in which the light beam originally traveled, and is reflected by the PBS 8 to be condensed on a photodetector 1 (16) through a condensing lens 1 (15) such that the information on the information optical disk 14 is reproduced.

Meanwhile, among light beams reflected by the bottom surface of the SIL 13, a light beam corresponding to an NAeff of less than 1 which has not been totally reflected is reflected to be circularly polarized light reversed from that at the time of incidence, like in the case of the reflection light from the optical disk 14 described above.

On the other hand, in a case of a light beam corresponding to an NAeff of equal to or more than 1 which is totally reflected, a phase difference δ expressed by an expression given below is generated between a P-polarized light component and an S-polarized light component. Accordingly, the light beam is displaced from circularly polarized light to become elliptically polarized light.

$$\tan(\delta/2) = \cos\theta i \times \sqrt{(N^2 \times \sin^2\theta i - 1)/(N \times \sin^2\theta i)} \quad \text{Expression (2)}$$

Therefore, after passing through the ¼ wavelength plate 9, the light beam contains a polarized light component in a direction that is the same as the direction in which the light beam originally traveled.

This polarized light component passes through the PBS 8 to be reflected by the BS 7, and is condensed on a photodetector 2 (18) through a condensing lens 2 (17).

This light beam monotonically decreases as a distance between the SIL bottom surface and the optical disk is reduced, so it is possible to use the light beam as an error signal.

When a target threshold value is determined in advance, it becomes possible to maintain the distance between the SIL bottom surface and the optical disk at a desired distance of 100 nm or less by performing the gap servo.

The gap servo is described in detail in the paper cited above.

Also, this light beam is not subjected to modulation by recording information on the optical disk 14, so it becomes possible to obtain a stable gap error signal regardless of the presence or absence of the recording information.

However, the optical disk 14 is easy to tilt mainly in a disk radial direction due to a change in temperature, humidity, or the like.

The reduced distance between the SIL bottom surface and the optical disk 14 increases a danger that the SIL bottom surface and the optical disk 14 come into contact with each other when a relative inclination exists therebetween.

When the SIL bottom surface and the optical disk 14 contact each other, the SIL bottom surface or the optical disk surface is scratched, which makes it difficult to attain precise information recording/reproduction after that.

FIG. 8A is a bird's-eye view of an SIL according to a conventional example and FIG. 8B is an enlarged view in the vicinity of a bottom surface of the SIL.

According to the paper cited above, a method is devised in order to alleviate the problem described above. More specifically, a side surface of the SIL is cut into a conical inclined surface forming an angle of 70° with an optical axis, and an effective portion of the bottom surface is condensed to 40 μm in diameter.

Despite this method, when the distance between the SIL bottom surface and the optical disk 14 is reduced to around 100 nm, the risk is increased that the SIL bottom surface and the optical disk may contact each other if a relative inclination of 0.28° or more exists.

When the distance between the SIL bottom surface and the optical disk 14 is reduced to around 50 nm, an allowable relative inclination is only 0.14°.

An ordinary plastic-made optical disk substrate tilts by around 0.5° due to a change in temperature, humidity, or the like, which significantly hinders practical use of a recording/reproduction method based on this system.

SUMMARY OF THE INVENTION

An object of the present invention is to provide an optical information recording/reproduction apparatus in which a tilt margin in a radial direction of an optical disk is increased to thereby reduce a danger that the optical disk 14 and an SIL 13 come into contact with each other as compared with a conventional case.

In particular, the optical information recording/reproduction apparatus includes: an objective lens for condensing a light beam from a light source, and a solid immersion lens (SIL) that is disposed between the objective lens and an optical recording medium, in which a shape of a bottom surface of the SIL on a recording medium side of the SIL is formed such that a length of the bottom surface in a radial direction orthogonal to a track direction of the recording medium is shorter than a length of the bottom surface in the track direction.

DESCRIPTION OF THE PREFERRED EMBODIMENTS

Preferred embodiments for carrying out the present invention will be described below with reference to the accompanying drawings.

First Embodiment

A first embodiment of the present invention will be described with reference to FIGS. 1A to 1C.

Figure 1A:
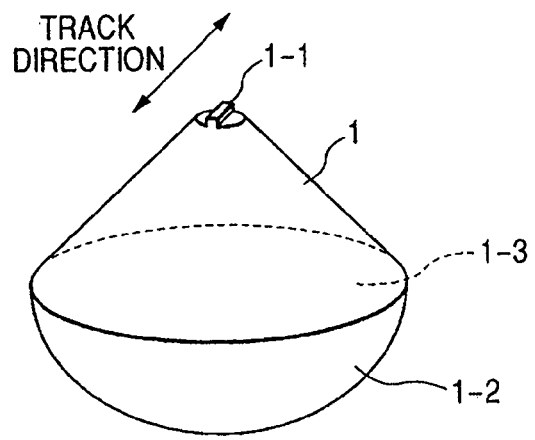
FIGS. 1A, 1B, and 1C are views for showing an SIL according to a first embodiment of the present invention.

FIG. 1A is a bird's-eye view for showing the whole of an SIL 1 according to the first embodiment of the present invention. FIG. 1B is an enlarged bird's-eye view of a bottom surface of the SIL according to the first embodiment of the present invention. FIG. 1C is an enlarged front view of the bottom surface of the SIL according to the first embodiment of the present invention.

Figure 1B:
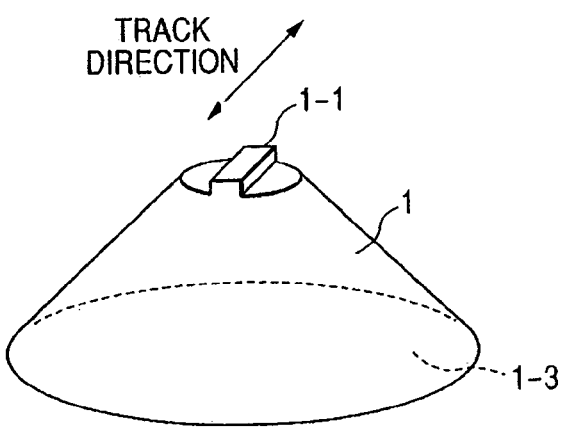
Figure 1C:
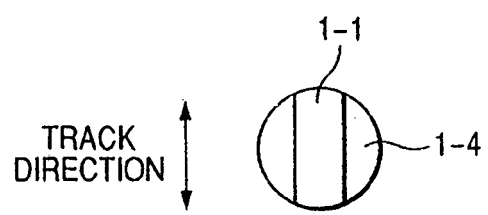

In FIGS. 1A to 1C, reference numeral 1-1 denotes the bottom surface of the SIL, 1-2 a spherical surface of the SIL, and 1-3 a conical inclined surface of the SIL.

The bottom surface 1-1 of the SIL is worked such that a track direction of an optical recording medium indicated with an arrow becomes a long-side direction of the bottom surface and a direction (radial direction of the optical recording medium) orthogonal to the track direction is reduced by one step difference in height from the bottom surface of the SIL.

In this embodiment, an effective portion of the SIL bottom surface has a size of 40 μm×20 μm (track direction×radial direction).

This is because an ordinary plastic-made optical disk substrate tilts mainly in the radial direction due to a change in temperature, humidity, or the like.

With the above construction, however, even when a distance between the SIL bottom surface and an optical disk 14 is reduced to around 100 nm, the disk and the SIL bottom surface will not contact each other in relative inclination up to around 0.56°.

Also, even when the distance between the SIL bottom surface and the optical disk 14 is reduced to around 50 nm, an allowable relative inclination is increased to around 0.28°.

In this embodiment, the aforementioned step difference in height provided for the SIL bottom surface is 1 μm.

It is sufficient that the step difference is provided with a height which can prevent an edge portion of the SIL bottom surface from contacting with the optical disk, so there is no need to provide a step difference in height larger than is necessary.

For instance, even when the distance between the SIL bottom surface and the optical disk 14 is reduced to around 100 nm and the relative inclination becomes 0.56°, the SIL edge portion maintains a distance of 800 nm from the optical disk.

It is sufficient that the step difference in height described above is selected in a range of from around 500 nm to 2 μm while giving a priority to easiness of work.

Like in the conventional example, in order to prevent a marginal light beam corresponding to the NA from being blocked, the side surface of the SIL is cut into a conical inclined surface that forms an angle of 70° with the optical axis.

Also, the size of the SIL bottom surface depends on positioning accuracy of a light beam with respect to the SIL bottom surface and has conventionally been set to generally around 20 μm to 100 μm in diameter.

In order to attain the present invention, the size of the SIL bottom surface in the optical disk track direction is set to be the same as that in the conventional example (20 μm to 100 μm), and the size of the SIL bottom surface in the radial direction orthogonal to the track direction is set to be smaller than that in the track direction, in accordance with the positioning accuracy of the light beam with respect to the SIL bottom surface.

Next, a method of manufacturing the SIL according to the present invention which includes the following steps (1) to (8) will be described in brief below.

(1) The SIL spherical surface 1-3 is polished.

(2) A thickness in an optical axis direction of the SIL is set in accordance with a desired NA and cutting is performed. In the case of a hemisphere, the spherical surface 1-3 is cut in half and in the case of a super-hemisphere, a thickness that is larger than a radius R by R/N is set and the spherical surface 1-3 is cut (N is the reflective index of the SIL).

(3) The SIL bottom surface is polished.

(4) A photoresist is applied to the SIL bottom surface.

(5) A stripe having a width (for instance, 20 μm), which corresponds to the SIL bottom surface 1-1 that is desired to be obtained, is formed on a diameter of the SIL by patterning the photoresist.

(6) The stripe is subjected to reactive ion etching or the like such that step difference in height and etched surfaces 1-4 and formed.

(7) The SIL conical surface is cut until the bottom surface has a diameter of around 40 μm.

(8) The photoresist on the SIL bottom surface 1-1 is removed.

Through the manufacturing steps described above, it is possible to manufacture the SIL of the first embodiment with ease.

According to the first embodiment of the present invention, it becomes possible to increase about two times as large tilt margin as compared with the conventional example even when a plastic-made optical disk substrate tilts in a radial direction due to a change in temperature, humidity, or the like.

Second Embodiment

Figure 2A:
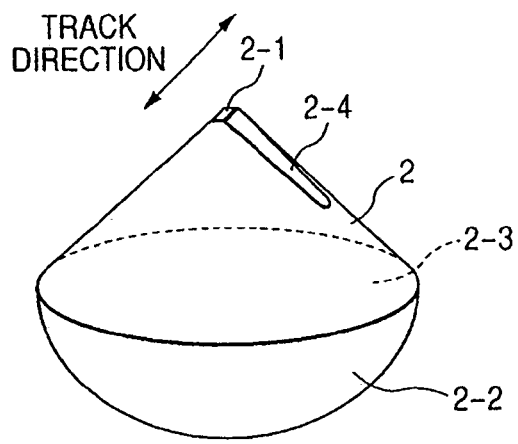
FIGS. 2A, 2B, and 2C are views for showing an SIL according toga second embodiment of the present invention.
Figure 2B:
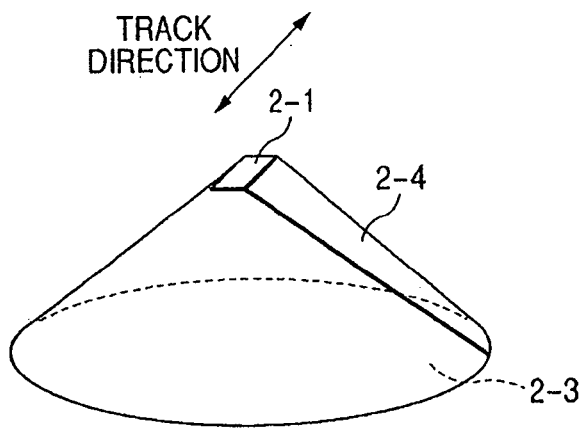
Figure 2C:
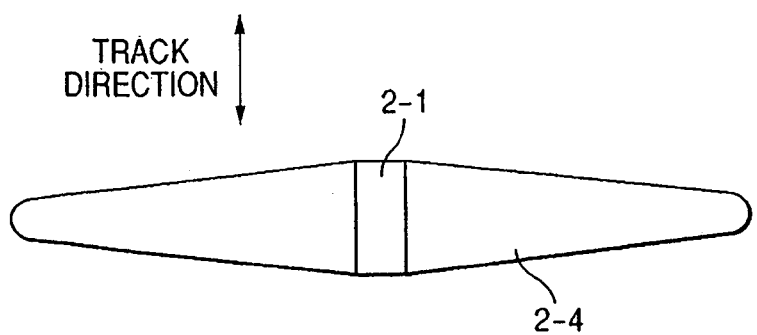

A second embodiment of the present invention will be described with reference to FIGS. 2A to 2C. FIG. 2A is a bird's-eye view showing the whole of an SIL 2 according to the second embodiment of the present invention. FIG. 2B is an enlarged bird's-eye view of a bottom surface of the SIL in the second embodiment of the present invention. FIG. 2C is an enlarged front view of the bottom surface of the SIL in the second embodiment of the present invention.

In FIGS. 2A to 2C, reference numeral 2-1 denotes the bottom surface of the SIL, 2-2 a spherical surface of the SIL, 2-3 a conical inclined surface of the SIL, and 2-4 a cut surface of the SIL.

The bottom surface 2-1 of the SIL is worked such that a track direction of an optical recording medium indicated with an arrow becomes a long-side direction of the bottom surface and the SIL cut surface 2-4 continues to the bottom surface 2-1 in a direction (radial direction of the optical recording medium) orthogonal to the track direction.

Like in the conventional example, in order to prevent a marginal light beam corresponding to an NA from being blocked, a side surface of the SIL is cut into a conical inclined surface forming an angle of 70° between the conical inclined surface and an optical axis.

In addition, the cut surface 2-4 of the SIL provided in the disk radial direction is obtained through cutting along disk tracks with a cutting tool forming an angle of 75° with respect to the optical axis.

In this embodiment, an effective portion of the SIL bottom surface is set to a size of 40 μm×20 μm (track direction×radial direction).

This is because an ordinary plastic-made optical disk substrate tilts mainly in the radial direction due to a change in temperature, humidity, or the like.

With the above construction of this embodiment, however, like in the first embodiment, even when a distance between the SIL bottom surface and an optical disk 14 is reduced to around 100 nm, the disk and the SIL bottom surface will not contact each other unless there occurs a relative inclination up to around 0.56°.

Also, even when the distance between the SIL bottom surface and the optical disk 14 is reduced to around 50 nm, an allowable relative inclination is increased to around 0.28°.

Next, a method of manufacturing the SIL including the following steps according to the present invention will be described in brief below.

(1) The SIL spherical surface 2-3 is polished.

(2) A thickness in an optical axis direction of the SIL is set in accordance with a desired NA and cutting is performed. In the case of a hemisphere, the spherical surface 2-3 is cut in half and in the case of a super-hemisphere, a thickness that is larger than a radius R by R/N is set and the spherical surface 2-3 is cut (N is the reflective index of the SIL).

(3) The SIL bottom surface is polished.

(4) The SIL conical surface is cut until the SIL bottom surface has a diameter of around 40 μm.

(5) With a cutting tool forming an angle of 75° with the optical axis, the SIL conical surface is cut in the track direction such that the SIL bottom surface 2-1 has a width of 20 μm in a short-side direction.

Through the manufacturing steps described above, it is possible to manufacture the SIL of the second embodiment with ease.

According to the second embodiment of the present invention, it becomes possible to increase about two times as large tilt margin as compared with the conventional example even when a plastic-made optical disk substrate tilts in the radial direction due to a change in temperature, humidity, or the like.

Third Embodiment

Figure 3:
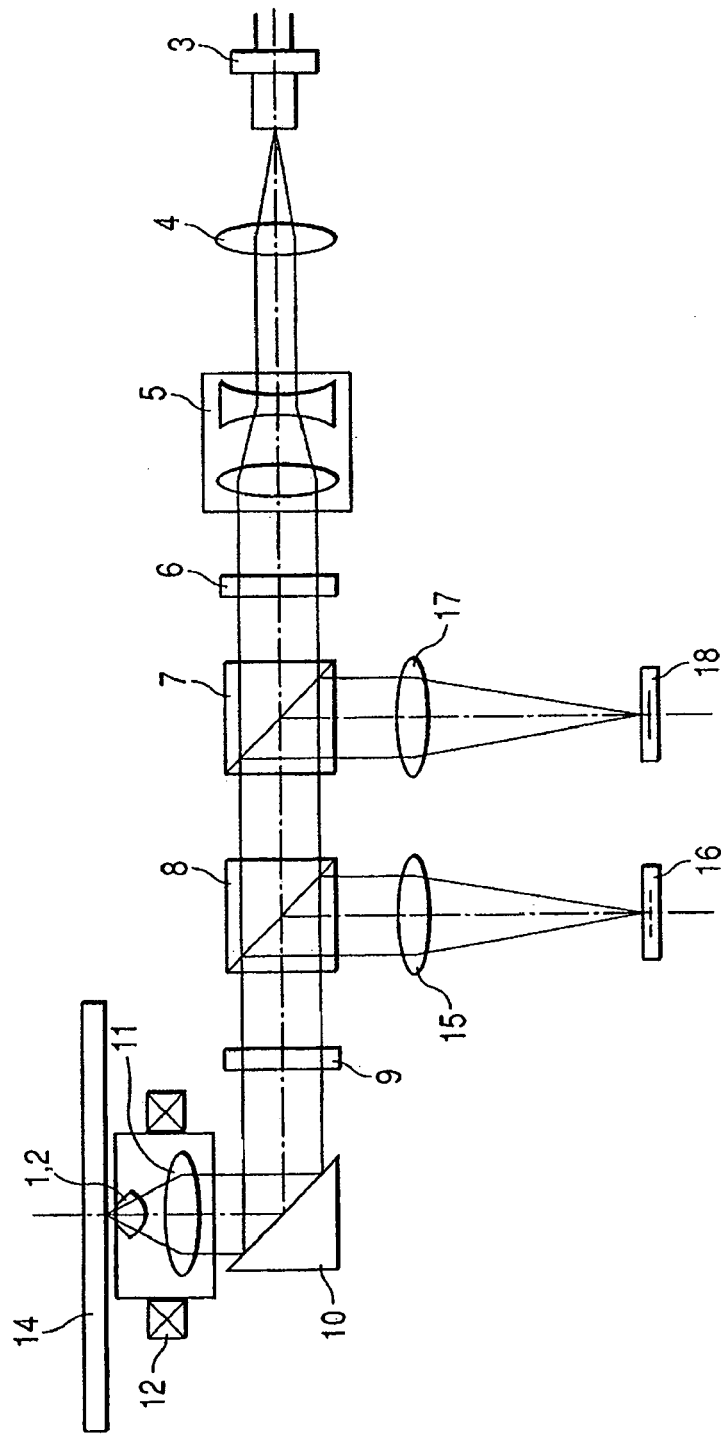
FIG. 3 is a block diagram for showing an optical information recording/reproduction apparatus using an SIL according to an embodiment of the present invention.

A third embodiment of the present invention will be described with reference to FIGS. 3 to 5.

A construction of an optical pickup for near-field recording according to the third embodiment of the present invention will be described with reference to FIG. 3.

Figure 6:
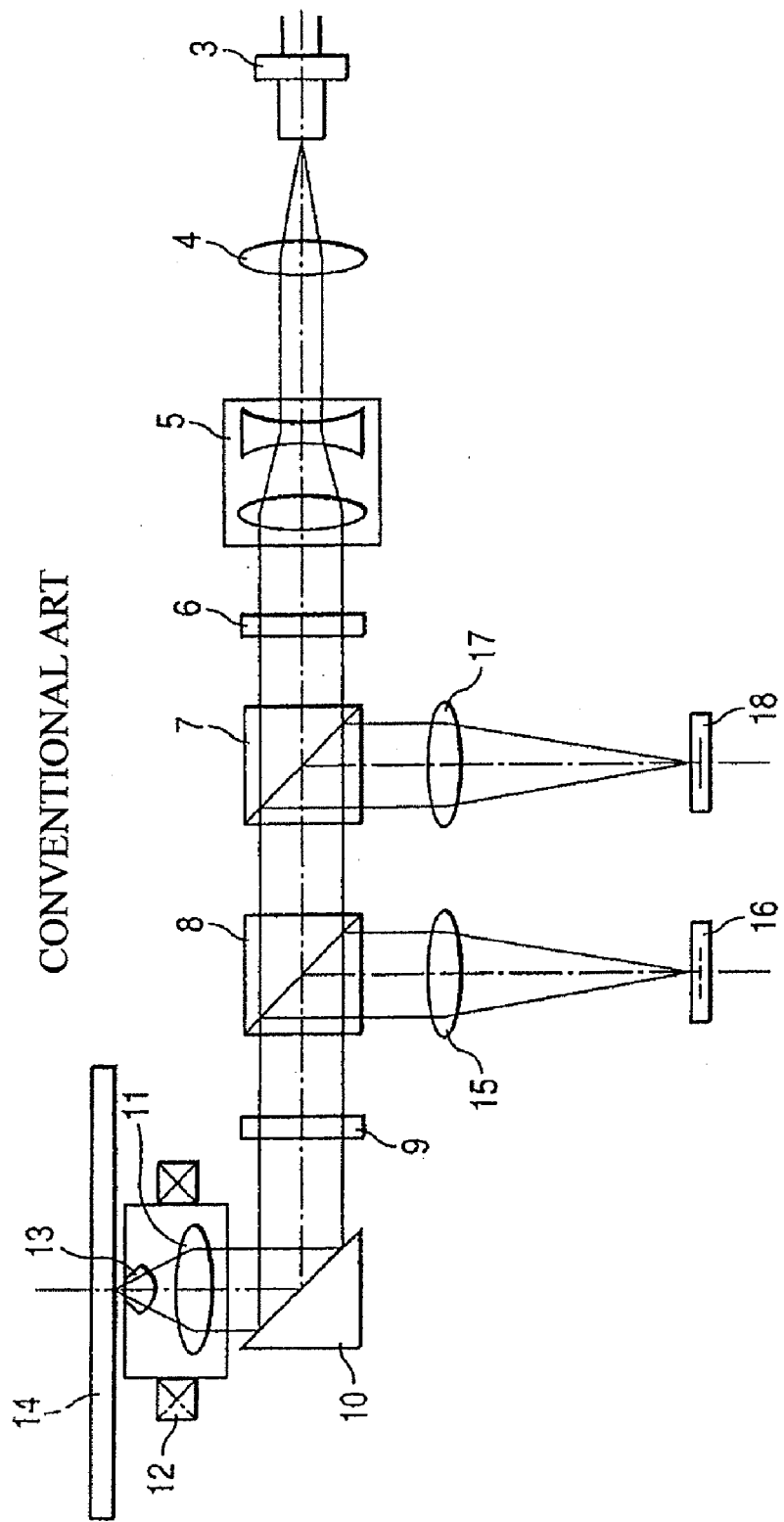
FIG. 6 is a view for showing an optical information recording/reproduction apparatus using an SIL according to a conventional example.

Each component that is the same as the component of FIG. 6 for explaining the conventional example is given the same reference numeral.

A light beam emitted from a semiconductor laser 3 is converted into a parallel light beam by a collimator lens 4 and enters a beam expander 5.

The beam expander 5 is a lens for correcting a spherical aberration occurred at an objective lens or an SIL to be described later and is constructed such that a distance between the two lenses of the beam expander is controllable in accordance with the spherical aberration.

A grating 6 is a member for generating sub-beams for tracking.

The light beam that has passed through a beam splitter (BS) 7 and a polarizing beam splitter (PBS) 8 passes through a ¼ wavelength plate 9 to be converted from linearly polarized light into circularly polarized light.

A photodetector (not shown) for receiving a part of the light beam reflected by the beam splitter 7 and controlling an emission power of the semiconductor laser 3 may also be provided.

The light beam, whose course is bent by 90° by an upwardly reflecting mirror 10, enters a rear lens 11 of the objective lens.

The objective lens is composed of the rear lens 11 and the SIL (front lens) 1 described in the first embodiment or the SIL 2 described in the second embodiment, and is mounted on a two-axis actuator 12 that integrally drives the two lenses in a focus direction and a tracking direction.

Figure 7A:
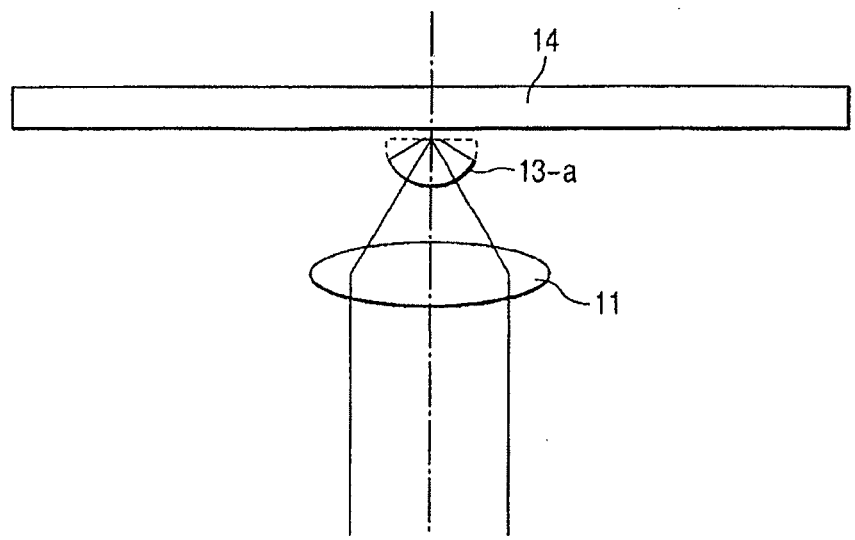
FIGS. 7A and 7B are views for showing the SIL according to the conventional example.
Figure 7B:
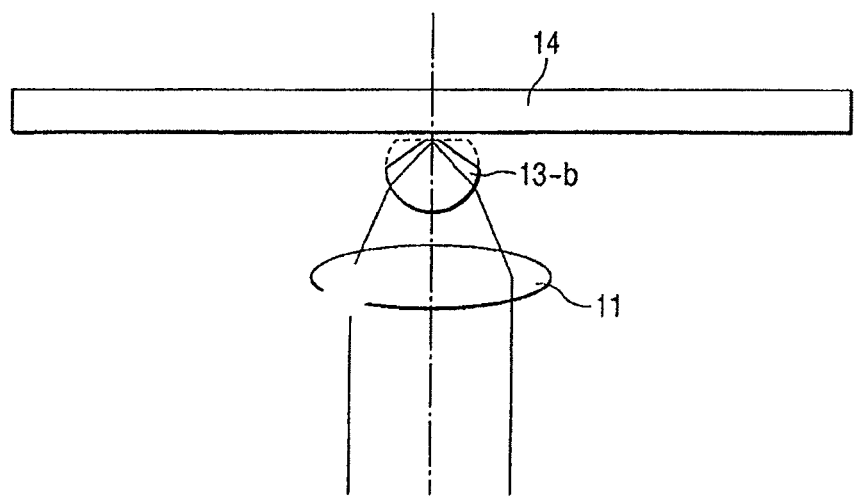
Figure 8A:
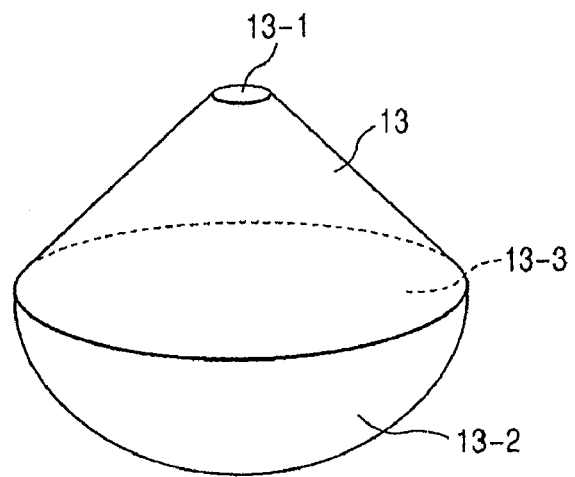
FIGS. 8A and 8B are bird's-eye views for the SIL according to the conventional example.
Figure 8B:
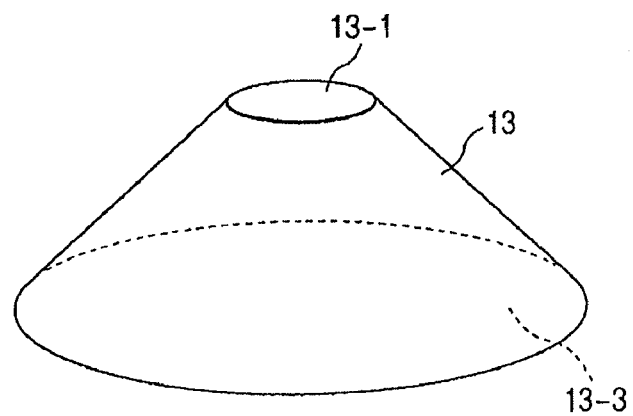

The SIL 1 or 2 may be either one of the types described with reference to FIGS. 7A and 7B.

A feature of the present invention is that a long-side direction of the SIL bottom surface 1-1 or 2-1 of the SIL 1 or 2 is arranged to coincide with a track direction of an optical disk 14.

As already described in the first and second embodiments, in the present invention, even when a plastic-made optical disk substrate tilts in a radial direction due to a change in temperature, humidity, or the like, it is possible to increase about two times as large tilt margin as compared with the conventional example.

Also, another feature of the present invention is that the sub-beams for tracking are arranged to coincide with the long-side direction of the SIL bottom surface 1-1 or 2-1 of the SIL 1 or 2.

With this construction, sub-beams incident on the SIL at an angle of view are arranged in the long-side direction of the SIL bottom surface 1-1 or 2-1 without problems.

In particular, a hemispherical SIL is suited for the arrangement of the sub-beams for tracking because a wide viewing angle can be secured with the hemispherical SIL.

Figure 4:
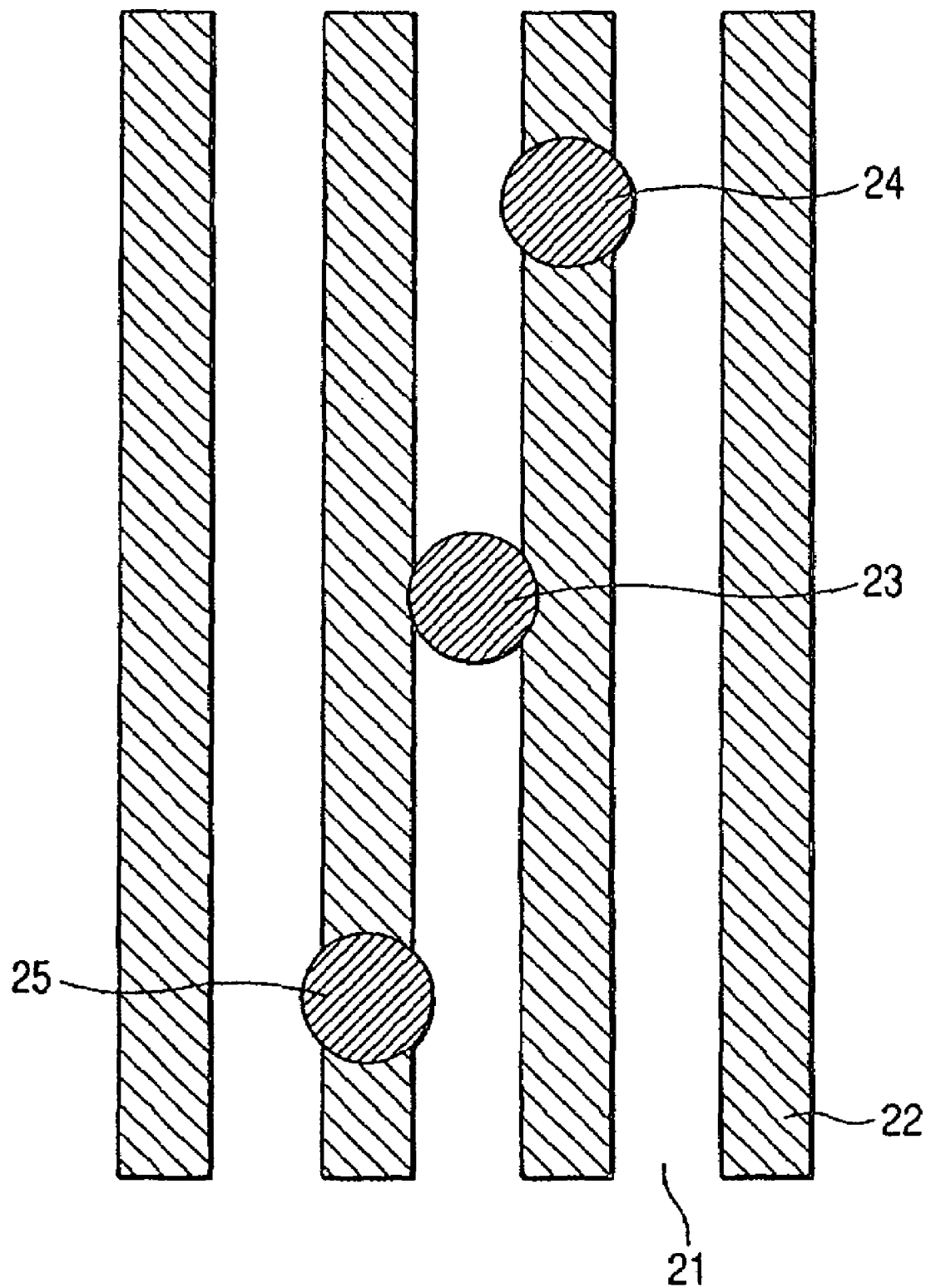
FIG. 4 is a view for showing an arrangement of light spots in the optical information recording/reproduction apparatus using the SIL according to the embodiment of the present invention.

FIG. 4 shows arrangement of light spots on the optical disk 14 according to the third embodiment of the present invention.

In FIG. 4, the optical disk 14 is of rewritable type or write-once type and is provided with grooves 22 for tracking.

Information is recorded/reproduced onto/from lands 21.

At the time of recording/reproduction, a main beam 23 is arranged on the lands 21 and a sub-beam 1 (24) and a sub-beam 2 (25) are arranged on the grooves 22 adjacent to recording tracks.

By receiving each of light beams from the main beam 23 and the sub-beams 24 and 25 with a 2-segment sensor (not shown), a push-pull tracking signal having a phase reversed by 180° is obtained.

It is possible to generate a differential push-pull tracking signal by adding up the push-pull signals from the sub-beams 24 and 25, multiplying a result of the addition by an appropriate constant, and subtracting a result of the multiplication from the push-pull signal from the main beam 23.

It is possible to obtain a differential push-pull tracking signal which will not generate an offset even when the two-axis actuator 12 that holds the rear lens 11 and the SIL is displaced in a disk radial direction for tracking.

Figure 5:
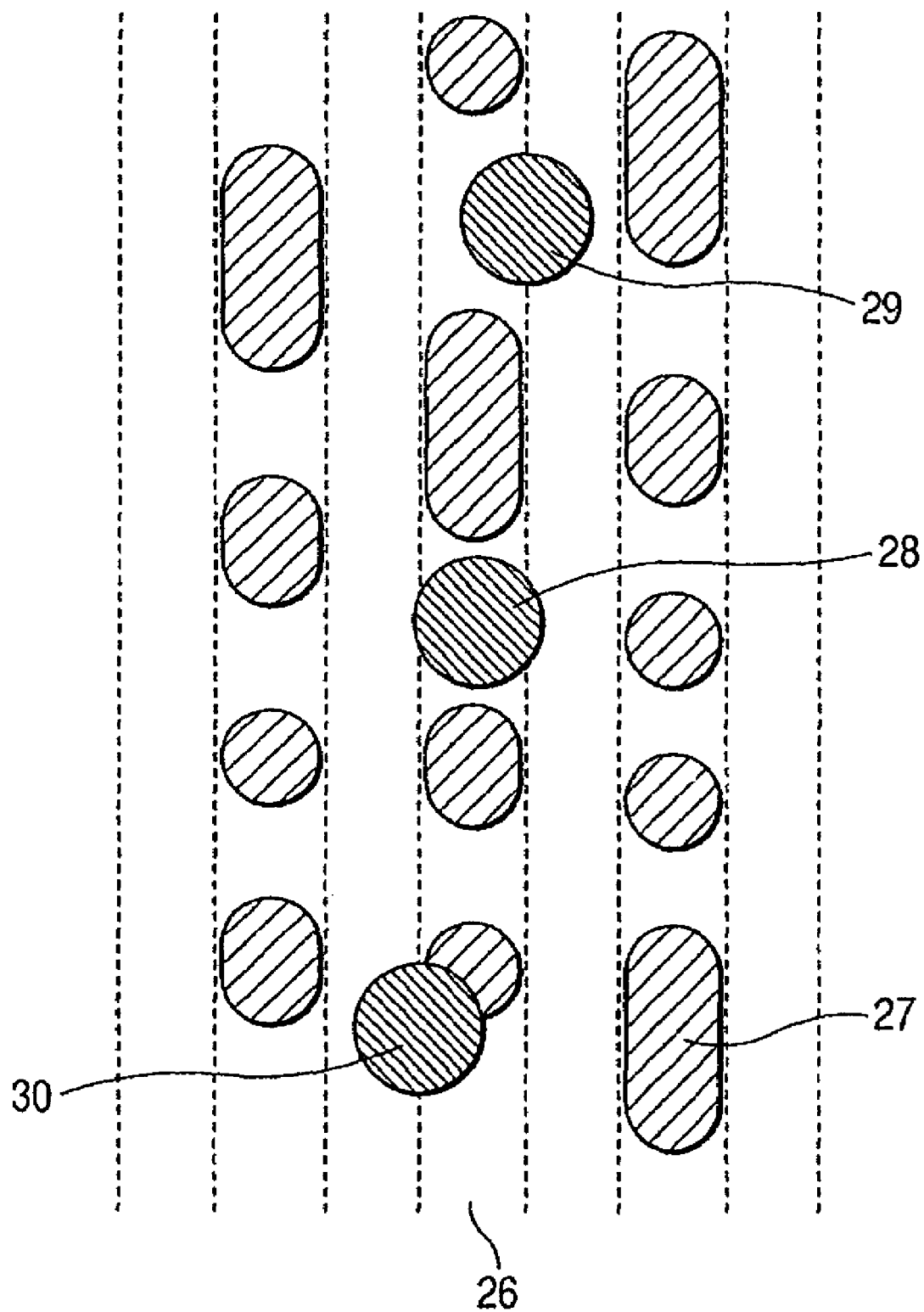
FIG. 5 is a view for showing another arrangement of the light spots in the optical information recording/reproduction apparatus using the SIL according to the embodiment of the present invention.

FIG. 5 shows another arrangement of the light spots on the optical disk 14 according to the third embodiment of the present invention.

In FIG. 5, the optical disk 14 is of read-only type and is provided with pit strings 27 on information tracks 26.

At the time of information reproduction, a main beam 28 is arranged on the information tracks 26 and a sub-beam 1 (29) and a sub-beam 2 (30) are arranged on edge portions of the pit strings 27 with a phase of ±90° with respect to the information tracks.

By receiving each of light beams from the sub-beams 29 and 30 with a sensor (not shown), and subtracting an output of the sensor, a so-called 3-beam tracking signal is obtained.

A light beam condensed by the rear lens of the objective lens is condensed on the bottom surface of the SIL 1 or 2 that is a hemispherical lens or a super-hemispherical lens. As a result of this condensation, regardless of whether the SIL is a hemispherical lens or a super-hemispherical lens, the light beam acts on the recording surface as evanescent light from the SIL bottom surface only when the distance between the SIL bottom surface and the optical disk 14 is a fraction or less of the wavelength (=405 nm) of the light source, for instance, a short distance of 100 nm or less. Therefore, recording/reproduction by an NAeff light spot diameter is possible.

In order to maintain this distance, the gap servo described above is used.

The light beam reflected by the optical disk 14 becomes reversed circularly polarized light, and enters the SIL 1 or 2 and the rear lens 11 to be converted into a parallel light beam again.

The light beam then passes through the ¼ wavelength plate 9 to be converted into linearly polarized light in a direction orthogonal to the direction in which the light beam originally traveled, and is reflected by the PBS 8 and is condensed on a photodetector 1 (16) through a condensing lens 1 (15), so that the information on the information optical disk 14 is reproduced.

When the optical disk of rewritable type or write-once type shown in FIG. 4 is used as the optical disk 14, the photodetector 1 (16) is set as a photodetector composed of three 2-segment sensors (not shown). With this construction, it becomes possible to add/subtract signals generated through reception of the light beams from the main beam 23 and the sub-beams 24 and 25 with the respective 2-segment sensors. As a result, it becomes possible to generate a differential push-pull tracking signal in addition to an information signal.

When the optical disk of read-only type shown in FIG. 5 is used as the optical disk 14, the photodetector 1 (16) is set as a photodetector composed of 3-segment sensors (not shown). With this construction, it becomes possible to receive the light beams from the main beam 28 and the sub-beams 29 and 30 with the respective sensors. It is possible to generate an information signal from an output from the sensor that receives the main beam. Also, it is possible to generate a 3-beam tracking signal from a result of subtraction of outputs from the two sensors that receive the sub-beams.

Meanwhile, among light beams reflected by the bottom surface of the SIL, a light beam corresponding to an NAeff of less than 1 which has not been totally reflected is reflected to be circularly polarized light which is reversed from that at the time of incidence, like in the case of a reflection light from the optical disk 14 described above.

On the other hand, in the case of a light beam corresponding to an NAeff of equal to or more than 1 which is totally reflected, a phase difference δ expressed by the aforementioned Expression (2) is generated between a P-polarized light component and an S-polarized light component. Accordingly, the light beam is displaced from circularly polarized light to become elliptically polarized light. Therefore, after passing through the ¼ wavelength plate 9, the light beam contains a polarized light component in the same direction as the direction in which the light beam originally traveled.

This polarized light component passes through the PBS 8 to be reflected by the BS 7, and is condensed on a photodetector 2 (18) through a condensing lens 2 (17).

This light beam monotonically decreases as a distance between the SIL bottom surface and the optical disk is reduced, whereby it is possible to use the light beam as an error signal.

When a target threshold value is determined in advance, it becomes possible to maintain the distance between the SIL bottom surface and the optical disk at a desired distance of 100 nm or less by driving the gap servo.

Also, since this light beam is not subjected to modulation by recording information on the optical disk 14, it becomes possible to obtain a stable gap error signal regardless of the presence or absence of the recording information.

As described above, it becomes possible to perform high-density recording using near-field light with stability using an ordinary plastic-made inexpensive optical disk substrate.

Also, by arranging the sub-beams for tracking in the long-side direction of the SIL bottom surface shape according to the present invention, it becomes possible to increase the tilt margin in the optical disk radial direction and also perform stable tracking.

This application claims priority from Japanese Patent Application No. 2005-149453 filed May 23, 2005, which is hereby incorporated by reference herein.

What is claimed is:

1. An optical information recording/reproduction apparatus, comprising:
   an objective lens for condensing a light beam from a light source; and
   a solid immersion lens disposed between the objective lens and an optical recording medium,
   wherein a shape of a bottom surface of the solid immersion lens on a recording medium side of the solid immersion lens is formed such that a length of the bottom surface in a radial direction orthogonal to a track direction of the recording medium is shorter than a length of the bottom surface in the track direction.

2. An optical information recording/reproduction apparatus according to claim 1, wherein the bottom surface is formed in a convex shape along the radial direction.

3. An optical information recording/reproduction apparatus according to claim 1, wherein between a surface of the solid immersion lens positioned on an objective lens side and the bottom surface of the solid immersion lens positioned on the recording medium side, a conical inclined surface is formed at an angle at which a most marginal light beam is not blocked.

4. An optical information recording/reproduction apparatus according to claim 3, wherein the bottom surface has a rectangular shape, the conical inclined surface is formed such that a part of the conical inclined surface including a long side of the rectangular shape as an end thereof is inclined at an angle larger than the angle at which the most marginal light beam is not blocked.

5. An optical information recording/reproduction apparatus according to claim 1, wherein a length of the shape of the bottom surface of the solid immersion lens on the track side is in a range of from 20 μm to 100 μm.

* * * * *